United States Patent
Mahadevan et al.

(10) Patent No.: US 12,500,837 B2
(45) Date of Patent: Dec. 16, 2025

(54) ACHIEVING SYMMETRIC ROUTING USING INTENT-BASED SMART DEVICE GROUPINGS IN A SOFTWARE-DEFINED WIDE AREA NETWORK

(71) Applicant: Cisco Technology, Inc., San Jose, CA (US)

(72) Inventors: Satish Kumar Mahadevan, San Ramon, CA (US); Basavaraju Halappa, San Jose, CA (US); Prosenjit Sarkar, Santa Clara, CA (US); Srinivas Yalamanchali, Fremont, CA (US); Sourav Sen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 18/344,685

(22) Filed: Jun. 29, 2023

(65) Prior Publication Data
US 2025/0007825 A1    Jan. 2, 2025

(51) Int. Cl.
*H04L 45/42* (2022.01)
*H04L 45/12* (2022.01)
*H04L 45/76* (2022.01)

(52) U.S. Cl.
CPC .......... *H04L 45/42* (2013.01); *H04L 45/123* (2013.01); *H04L 45/76* (2022.05)

(58) Field of Classification Search
CPC . H04L 12/4641; H04L 12/462; H04L 49/354; H04L 49/70; H04L 63/0876; H04L 63/0428; H04L 63/1441; H04L 45/745; H04L 63/0227; H04L 63/06; H04L 63/105; H04L 63/205; H04L 67/565; H04L 69/08; H04L 9/0894; H04L 9/3226; H04L 9/3228; H04L 41/046; H04L 41/0809;
(Continued)

(56) References Cited

U.S. PATENT DOCUMENTS 10,826,775 B1    11/2020   Moreno et al.
11,310,145 B1    4/2022    Lin et al.
(Continued)

OTHER PUBLICATIONS

International Search Report and Written Opinion for International Application No. PCT/US2024/035817, mailed Sep. 26, 2024, 15 Pages.

*Primary Examiner* — Djenane M Bayard
(74) *Attorney, Agent, or Firm* — Lee & Hayes, P.C.

(57) ABSTRACT

Techniques for symmetric routing in a software-defined wide area network (SDWAN) are disclosed herein. In some aspects, the techniques described herein relate to a method including: determining a first device group, wherein the first device group includes a first router associated with a branch tag and a second router associated with a hub tag; determining a second device group, wherein the second device group includes a third router associated with and a fourth router associated with the hub tag; transmitting a first route advertisement associated with a first route from the first router to the second router to the first router; transmitting a second route advertisement associated with a second route from the first router to the third router to the first router; and preventing transmission of a third route advertisement associated with a third route from the first router to the fourth router to the first router.

20 Claims, 8 Drawing Sheets

(58) Field of Classification Search
CPC ......... H04L 67/12; H04L 45/02; H04L 45/04; H04L 45/123; H04L 45/42; H04L 45/46; H04L 45/50; H04L 45/58; H04L 45/64; H04L 45/655; H04L 45/76; H04L 63/0823; H04L 63/083; H04L 63/10; H04L 67/025; H04L 67/34; H04L 12/4625; H04L 12/54; H04L 63/0245; H04L 63/0853; H04L 63/0861; H04L 63/12; H04L 63/145; H04L 67/06; H04L 9/0861; H04L 9/14; H04L 9/3239; H04L 9/40; H04L 9/50; H04L 45/586; H04L 45/24; H04L 12/4633; H04L 41/0894; H04L 41/122; H04L 63/0272; H04L 12/4675; H04L 12/4683; H04L 41/0895; H04L 41/22; H04L 41/40; H04L 41/5009; H04L 43/08; H04L 43/0829; H04L 43/0864; H04L 43/087; H04L 43/0876; H04L 43/0888; H04L 43/20; H04L 45/033; H04L 45/125; H04L 45/22; H04L 45/28; H04L 45/34; H04L 45/38; H04L 45/44; H04L 45/74; H04L 45/7453; H04L 47/125; H04L 49/25; H04L 63/0263; H04L 69/324; G06F 2009/45595; G06F 9/45558

See application file for complete search history.

(56) References Cited

U.S. PATENT DOCUMENTS

| | | | |
|---|---|---|---|
| 11,463,343 B2* | 10/2022 | Sarcar | H04L 45/033 |
| 11,632,268 B2* | 4/2023 | Sridhar | H04L 12/4641 370/389 |
| 2002/0191541 A1* | 12/2002 | Buchanan | H04L 63/0272 370/230 |
| 2019/0036813 A1 | 1/2019 | Shenoy et al. | |
| 2019/0386918 A1* | 12/2019 | Iyer | H04L 41/5009 |
| 2021/0184896 A1 | 6/2021 | Dunbar et al. | |
| 2021/0185013 A1 | 6/2021 | Zhang et al. | |
| 2021/0288881 A1 | 9/2021 | Zhang | |
| 2021/0306261 A1 | 9/2021 | Duan et al. | |
| 2022/0021606 A1 | 1/2022 | Kaplan et al. | |
| 2022/0052984 A1 | 2/2022 | Valluri et al. | |
| 2023/0110199 A1* | 4/2023 | Gupta | H04L 45/586 709/238 |
| 2024/0031296 A1* | 1/2024 | Ramaswamy | H04L 45/124 |

* cited by examiner

```
{
  "DEVICE-GROUP": 1,
  "APPLIED-TO-SITE-TYPE-TAGS": ["HUB"]
}
```

ACHIEVING SYMMETRIC ROUTING USING INTENT-BASED SMART DEVICE GROUPINGS IN A SOFTWARE-DEFINED WIDE AREA NETWORK

TECHNICAL FIELD

The present invention is directed to the field of computer networking and, more specifically, to designing routing protocols for Software-Defined Wide Area Networks (SD-WANs).

BACKGROUND

Wide Area Networks (WANs) are used by organizations to connect geographically dispersed offices and data centers. These networks are typically managed using a combination of leased lines, Frame Relay or Asynchronous Transfer Mode (ATM) networks, and Multiprotocol Label Switching (MPLS) networks. However, these legacy WAN technologies are often expensive, inflexible, and slow to adapt to changes in network traffic patterns.

To address these challenges, Software Defined WAN (SDWAN) has emerged as a new technology that provides a more cost-effective, flexible, and scalable approach to WAN management. SDWAN uses software to abstract the underlying physical network infrastructure and provides a centralized control plane to manage the network. This allows network administrators to dynamically allocate bandwidth to different applications and prioritize traffic based on business needs.

However, the implementation of SDWAN has its own set of challenges. For instance, achieving effective capacity planning and flow symmetry in the presence of a full mesh network topology can be difficult to achieve in a large and complex SDWAN. When there is traffic asymmetry, it can lead to disruptions in stateful services, such as video conferencing or Voice over Internet Protocol (VOIP) calls. Similarly, a partial mesh topology can lead to suboptimal routing and increase network latency.

Therefore, there is a need for an SDWAN architecture that can maintain flow symmetry even with a full mesh topology, and efficient routing while also being scalable and flexible enough to accommodate changes in network traffic patterns.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 provides an operational example of constraint data associated with a router.

DESCRIPTION OF EXAMPLE EMBODIMENTS

Overview

Figure 1:
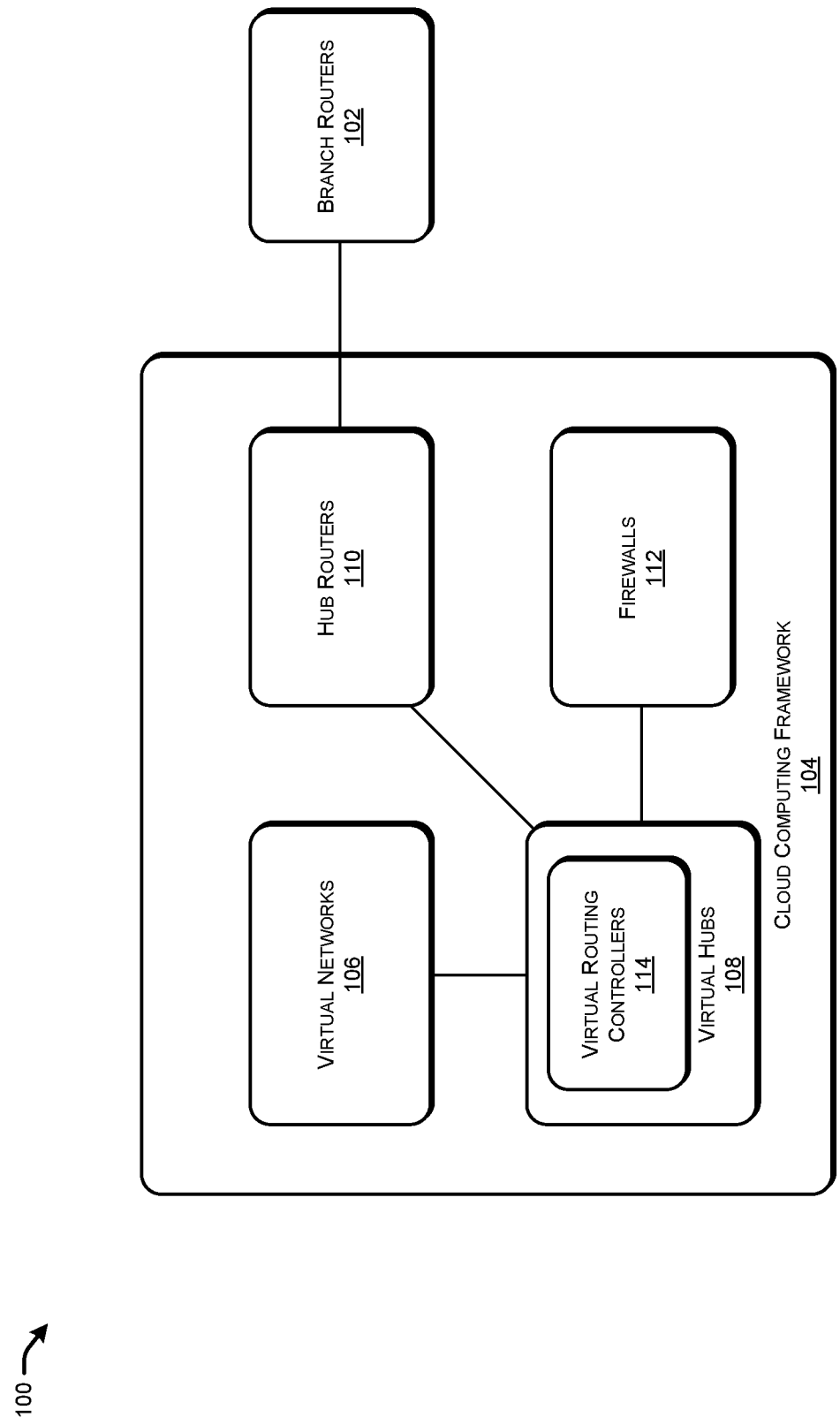
FIG. 1 is an architecture diagram for an example SDWAN.

Techniques for symmetric routing in a software-defined wide area network (SDWAN) are disclosed herein. In some aspects, the techniques described herein relate to a method including: determining a first device group, wherein: (i) the first device group includes a first router and a second router, (ii) the first router is associated with a branch tag, and (ii) the second router is associated with a hub tag; determining a second device group, wherein: (i) the second device group includes a third router and a fourth router, (ii) the third router is associated with the branch tag, and (ii) the fourth router is associated with the hub tag; transmitting a first route advertisement associated with a first route to the first router, wherein the first route is from the first router to the second router; transmitting a second route advertisement associated with a second route to the first router, wherein the second route is from the first router to the third router; and preventing transmission of a third route advertisement associated with a third route to the first router, wherein the third route is from the first router to the fourth router.

Additionally, the techniques described herein may be performed by a system and/or device having non-transitory computer-readable media storing computer-executable instructions that, when executed by one or more processors, performs the method described above.

Example Embodiments

Techniques for symmetric routing in a software-defined wide area network (SDWAN) are disclosed herein. A SDWAN may provide a centralized approach to managing and controlling a network, allowing for efficient traffic routing and security. In some cases, the techniques described herein address issues of traffic asymmetry, which can cause disruptions to stateful services of software applications executed using the SDWAN, such as various cloud-based video conferencing application.

In some cases, an SDWAN includes branch routers, hub router units, and virtual hubs, each of which serves a specific purpose in the network. In some cases, an example SDWAN architecture enables compliance with two main requirements for optimal performance: symmetry and full mesh across all branches. The symmetry requirement may refer to the requirement that each branch router connects to only one hub router unit, and each hub router unit connects to at most one virtual hub. The full mesh requirement may refer to the requirement that each pair of branch routers can directly connect to each other. In some cases, providing full mesh network topology is important for various applications with real-time or near-real-time processing requirements, because such a topology may provide a high degree of fault tolerance and ensure that every node is connected.

To achieve compliance with the symmetry and branch router full mesh requirements, an example SDWAN architecture divides branch routers and hub router units into device groups, where each device group may include a subset of the branch routers and a subset of the hub routers. A device group can include any number of routers, as long as the group meets the requirements of the symmetry and full mesh topologies. For example, a device group A can include branch routers A and B, and hub routers A and B, while device group B can include branch routers C and D and hub routers C and D. No router can be part of more than one device group. In some cases, every router is part of at least one device group.

In some cases, each router in an example SDWAN architecture is assigned a constraint, which determines which other routers it can communicate with. For a branch router, the constraint is a condition constraint that applies only to transmissions to hub routers and constrains the branch router to transmitting to hub routers within the same device group only. Accordingly, the branch router can send packets to other branch routers and hub router units that are in the same device group as the branch router. The device-group constraint conditions enable branch routers to communicate with each other even when the branch routers are in different device groups. For a hub router, the constraint constrains the hub router to transmitting to routers within the same device group only. Accordingly, a hub router may describe that the hub router can only send packets to branch routers that are in the same device group as the hub router.

In some cases, to facilitate communication between routers, an example SDWAN architecture uses selective transmission and/or filtering of route advertisements. A route advertisement may be a message sent by a router and/or a virtual routing controllers to neighboring routers, announcing the availability of a route to a particular route. The route advertisement may include information about the network, such as its IP address and subnet mask. When a router receives a route advertisement, it can update its routing table to include the new route. A route may be a physical route or a logical (e.g., overlay) route.

In some cases, the techniques described herein include filtering route advertisements to ensure compliance with the constraints. For example, if a hub router in device group A receives a route advertisement from a hub router in device group B, the hub router in device group A will not forward the route advertisement to any of the branch routers in device group A, as they are not in the same device group as the hub router in device group B. This selective filtering may ensure that traffic flows only between routers that are allowed to communicate with each other, according to their assigned constraints.

In some cases, the techniques described herein enable maintaining flow symmetry in an SDWAN architecture. By ensuring that each branch router in the SDWAN connects to only one hub router unit and each hub router unit connects to at most one virtual hub, the techniques described herein maintain flow symmetry. This flow symmetry ensures that traffic flows smoothly and consistently in both directions, without any disruptions to stateful services.

In some cases, the techniques described herein enhance security and reliability of an SDWAN by selectively filtering route advertisements. By enabling selective filtering of route advertisements, the techniques described herein may ensure that only authorized routes are advertised, and unauthorized routes are blocked. This may help to enhance network security and reliability by preventing unauthorized access to the SDWAN. The filtering of route advertisements enables granular control over which routes are allowed and which are not, thereby enhancing the security and stability of the SDWAN architecture.

FIG. 1 is an architecture diagram for an example SDWAN 100. As depicted in FIG. 1, the SDWAN 100 includes a cloud computing framework 104 that provides network services to a number of branch routers 102. The cloud computing framework 104 includes virtual hubs 108, firewalls 112, virtual networks 106, and hub routers 110. The hub routers 110 facilitate connection between the branch routers 102 and the virtual hubs 108. The virtual hubs 108 connect to outside networks such as the Internet using the firewalls 112. The virtual hubs 108 execute operations associated with virtual routing controllers 114 such as Cisco's vSmart controller.

The branch routers 102 may be located at remote sites and connect to the cloud computing framework 104 to perform network services such as routing, security, and application optimization. The branch routers 102 can be implemented using various hardware or software-based solutions, such as Cisco Integrated Services Routers (ISRs) or other similar devices.

The virtual hubs 108 may be cloud-based network entities that provide centralized network services and connectivity to the branch routers 102. The virtual hubs 108 may be implemented as virtual machines or containers running in a cloud environment such as Microsoft Azure, Amazon Web Services (AWS), or Google Cloud Platform. The virtual hubs 108 can host multiple gateways such as a site-to-site virtual private network (VPN) gateway, an ExpressRoute gateway, a point-to-site gateway, and an Azure firewall.

The firewalls 112 may provide security services to the virtual hubs 108 and the virtual networks 106. The firewalls 112 may be implemented as virtual machines or cloud services such as an Azure Firewall, Amazon Web Services (AWS) Security Groups, or a Google Cloud firewall. The firewalls 112 may be configured to allow or deny traffic between the virtual hubs 108 and the virtual networks 106, and to filter traffic based on predefined security policies.

The virtual networks 106 may provide connectivity between the virtual hubs 108 and other cloud resources such as virtual machines, cloud services, and storage. The virtual networks may be implemented as network segments or subnets in a cloud environment and can be configured with different internet protocol (IP) address ranges, security policies, and routing configurations.

The hub routers 110 may provide connectivity between the branch routers 102 and the virtual hubs 108. The hub routers 110 may be implemented as virtual machines or physical devices such as Cisco Cloud Services Routers (CSRs), and may be deployed in the same cloud environment as the virtual hubs 108 (e.g., in the cloud computing framework 104). The hub routers 110 may be configured with routing policies, VPN configurations, and security policies to ensure secure and reliable connectivity between the branch routers 102 and the virtual hubs 108.

The virtual routing controllers 114 such as Cisco's vSmart controller may provide centralized management and orchestration of the SDWAN 100. The virtual routing controllers 114 may be implemented as virtual machines or containers running in the cloud environment and may be responsible for configuring the routing policies, VPN configurations, and security policies for the virtual hubs 108 and the hub routers 110. The virtual routing controllers 114 may also monitor the network performance, dynamically adjust the routing policies, and perform traffic engineering to optimize the network performance.

Alternative SDWAN architectures can include hybrid cloud deployments where some network services are provided by on-premises hardware or software-based devices, or by third-party cloud services. Another alternative can be a fully decentralized architecture where each branch router acts as a standalone SDWAN device without relying on centralized network services or controllers.

Figure 2:
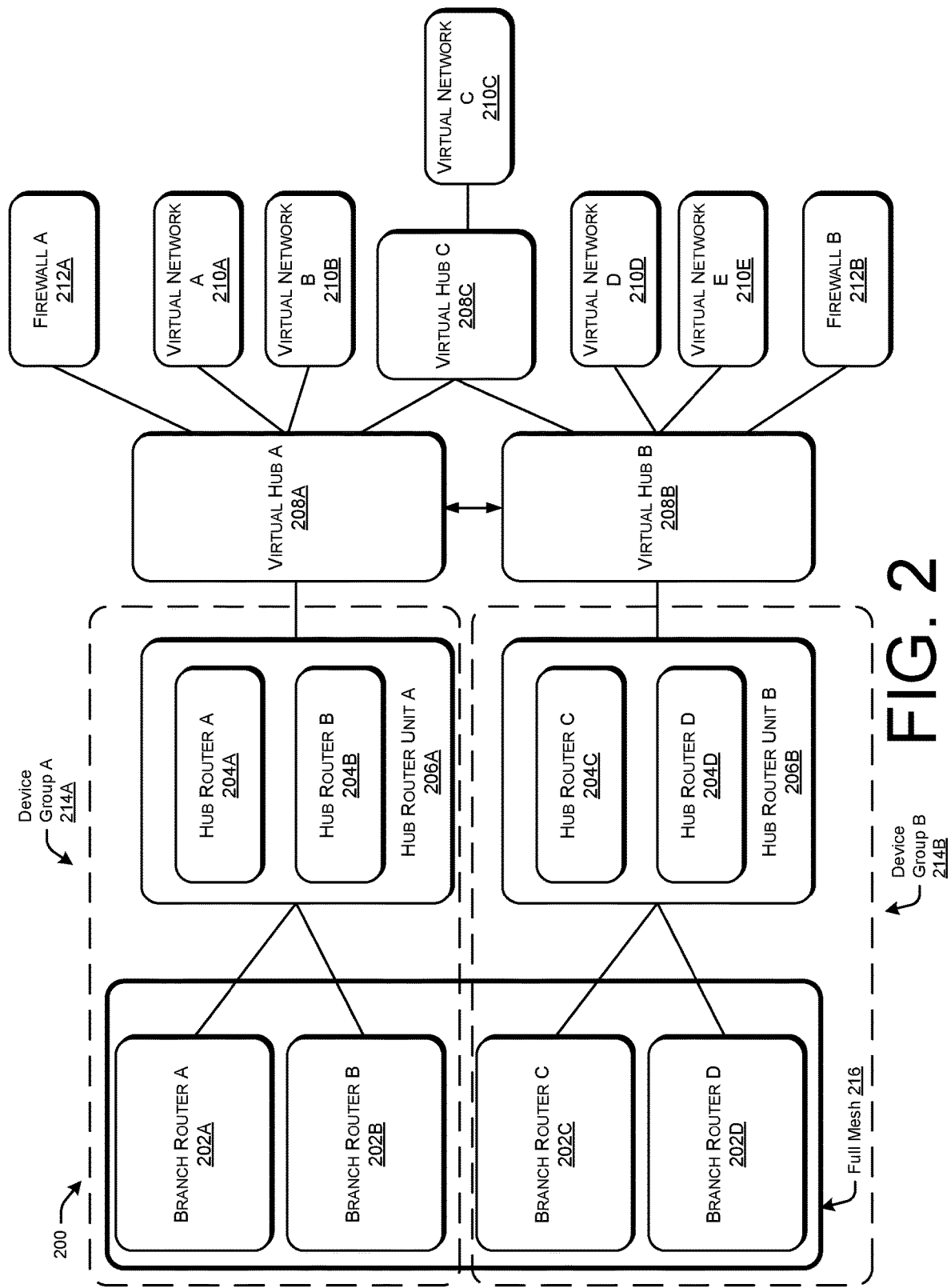
FIG. 2 depicts an example SDWAN architecture that includes a number of branch routers and virtual hubs, connected by hub router units.

FIG. 2 depicts an example SDWAN architecture 200 that includes a number of branch routers and virtual hubs, connected by hub router units. The branch routers A-D 202A-202D may be examples of branch routers 102 of FIG. 1 and may be implemented in the same or similar way.

Each hub router unit is connected to a single virtual hub and includes a set of hub routers. The hub routers A-D 204A-204D may be examples of the hub routers 110 of FIG. 1 and may be implemented in the same or similar way. As depicted in FIG. 2, the hub router unit A 206A includes the hub router A 204A and the hub router B 204B, while the hub router unit B 206B includes the hub router C 204C and the hub router D 204D. Each hub router unit is responsible for connecting the branch routers to the virtual hubs. The hub routers within the hub router units may perform packet forwarding and routing.

The virtual hubs A-C 208A-C may be examples of the virtual hubs 108 of FIG. 1 and may be implemented in the same or in a similar way. Each virtual hub may be connected to one or more other virtual hubs and one hub router unit. In particular, the virtual hub A 208A is connected to the hub router unit A 206A and the virtual hub C 208C, while the virtual hub B 208B is connected to the hub router unit B 206B and the virtual hub C 208C. The virtual hub C 208C is not directly connected to either of the two hub router units, but it is connected to the virtual hubs A and B. The virtual hubs may provide centralized management of the SDWAN and perform network services such as firewalling, load balancing, and traffic optimization. The virtual hubs may execute virtual routing controllers, such as Cisco's vSmart controller, to determine the best path for data traffic to travel through the network.

In the SDWAN architecture 200, each virtual hub may be connected to one or more virtual networks. In particular, the virtual hub A 208A is connected to the virtual network A 210A and the virtual network B, allowing for communication between the branch routers and the virtual networks. Similarly, the virtual hub B 208B is connected to the virtual network D 210D and the virtual network E 210E, which also enables communication between the branch routers and the virtual networks. Finally, the virtual hub C 208C is connected to the virtual network C 210C, enabling communication between the virtual network and the branch routers.

The virtual networks A-E 210A-210E may be examples of the virtual networks 106 of FIG. 1 and may be implemented in the same or similar way. The virtual networks may represent different parts of a computing framework and/or different security zones within a network. The connections between the virtual hubs and virtual networks may be managed by the virtual routing controllers running on the virtual hubs. The virtual routing controllers may additionally or alternatively ensure that the appropriate routes are advertised and that traffic is forwarded to the correct destinations. Using virtual routing controller to advertise routes in an SDWAN may ensure flexible and secure communication between the branch routers and the virtual networks, allowing for efficient network operations and management.

In addition to being connected to one or more virtual networks, each virtual hub in the SDWAN architecture 200 may also be connected to a firewall that manages the connection between the virtual hub and an external network such as the Internet. In the depicted SDWAN architecture 200 of FIG. 2, the virtual network A 210A is connected to the firewall A 212A and the virtual network B 210B is connected to the firewall B 212B. The firewalls A-B 212A-212B may be examples of the firewalls 112 of FIG. 1 and may be implemented in the same or similar way. The firewalls may be responsible for ensuring that traffic from the virtual hubs to the external network is secure and meets the necessary security protocols. The firewalls may implement a variety of security measures such as access control policies, threat detection and mitigation, and data encryption to protect against unauthorized access or data breaches. In some cases, the firewalls operate as a gateway between the virtual hubs and the external network, allowing the SDWAN architecture 200 to securely connect to and communicate with external systems and services.

In the SDWAN architecture 200 of FIG. 2, it may be important that each branch router connects to only one hub router unit and each hub router unit connects to at most one virtual hub to ensure that the return traffic from a dangling virtual hub to a branch router that is not connected to any hub router units (such as the virtual hub C 210C) travels the same path as the traffic to the dangling virtual hub from the branch router. If a branch router connects to more than one hub router unit and/or if a hub router unit connects to more than one virtual hub, then the traffic from the branch router to a dangling virtual hub that is not connected to any hub router units travels a different path than the traffic from the dangling virtual hub to the particular branch. This so-called "traffic asymmetry" in transmissions to and from branch routers to dangling virtual hubs can lead to disruption in stateful services of an application.

An example of traffic asymmetry with respect to the dangling virtual hub C 210C in the SDWAN architecture of FIG. 2 can occur when a branch router such as branch router A 202A sends traffic to virtual hub C 210C, but the return traffic from virtual hub C 210C takes a different path to reach branch router A 202A. This can happen if the hub router unit A 206A that is connected to branch router A 202A is not the only hub router unit connected to virtual hub C 210C. If virtual hub C 210C is also connected to hub router unit B 206B, which is in turn connected to branch router D 202D, the return traffic from virtual hub C 210C to branch router A 202A may take a different path than the traffic from branch router A 202A to virtual hub C 210C. This can cause traffic asymmetry and disrupt stateful services of applications that rely on flow symmetry, such as those using Network Address Translation (NAT) or firewall rules. As a result, the stateful service may fail, leading to poor application performance, disconnections, or other problems.

For example, consider an application that requires a consistent session state to be maintained between the client and the server. When the return traffic from a virtual hub takes a different path than the traffic to the virtual hub, the session state may be lost, and the client may need to re-establish the connection with the server. This can result in poor application performance and a degraded user experience. In contrast, by using an SDWAN architecture such as the SDWAN architecture 200 of FIG. 2, flow symmetry is maintained, and stateful services can work without disruption to the application's performance.

In the SDWAN architecture 200 of FIG. 2, it may be important that branch routers are part of a full mesh network such that each pair of branch routers can directly connect to each other. In some cases, such a full mesh network provides the most efficient path for communication between any two branch routers and eliminates the need for traffic to travel through intermediate nodes.

In some cases, establishing a full mesh network among branch routers reduces latency, improves network performance, and enables faster response times. For example, in a video conferencing application where participants need to communicate in real-time with each other and any delays or latency issues could result in poor video and audio quality, if branch routers are not part of a full mesh network, traffic may have to pass through intermediate nodes, resulting in additional delays and increased latency. This could lead to poor video and audio quality, disconnections, and a poor user experience. Moreover, without a full mesh network among branch routers, communication between branch routers may be slower, and the network may experience congestion and bottlenecks, leading to increased latency and reduced network performance. This could result in a poor user experience, and could also impact the performance of other applications running on the network.

Accordingly, in some cases, it is important that, in an SDWAN: (i) a symmetry requirement is satisfied, such that each branch router connects to only one hub router unit and each hub router unit connects to at most one virtual hub, and (ii) a full mesh requirement is satisfied is satisfied, such that each pair of branch routers can directly connect to each other. In some cases, the SDWAN architecture 200 of FIG. 2 complies with both requirements by: (i) dividing branch routers and hub router units in the device groups, such that each device groups includes a subset of the SDWAN's branch routers and a subset of the SDWAN's hub routers, (ii) performing operations that ensure that each branch router can only send a packet to the hub router units in the same device groups as the branch router and to other branch routers, and/or (iii) performing operations that ensure that each hub router can only send a packet to the branch routers in the same device as group as the hub router. In some cases, the SDWAN architecture 200 of FIG. 2 complies with both requirements by ensuring that: (i) branch routers and hub router units in the SDWAN are divided into device groups, where each device groups includes a subset of the SDWAN's branch routers and a subset of the SDWAN's hub routers, (ii) performing operations that ensure that each branch router can only send packets to the hub router units in the same device groups as the branch router and to other branch routers, and/or (iii) performing operations that ensure that each hub router can only send packets to the branch routers in the same device as group as the hub router. In some cases, the SDWAN architecture 200 of FIG. 2 complies with both requirements by: (i) dividing branch routers and hub router units in the device groups, such that each device groups includes a subset of the SDWAN's branch routers and a subset of the SDWAN's hub routers, (ii) performing operations that ensure that no branch router can send a packet to hub router units that are outside the device group of the branch router, and/or (iii) performing operations that ensure that no hub router can send a packet to branch routers that are outside the device group of the hub router and/or to other hub routers.

In some cases, by dividing branch routers and hub router units into device groups, the SDWAN ensures that each device group includes a subset of the branch routers and hub routers. Operations are then performed to ensure that each branch router can only send packets to the hub router units in the same device groups as the branch router and to other branch routers, while each hub router can only send packets to the branch routers in the same device group as the hub router. This ensures traffic flows in a symmetrical manner, which is necessary for proper functioning of stateful services, such as network address translation and firewall rules.

In some cases, a device group is a collection of branch routers and hub router units that are grouped together based on certain criteria (e.g., such as geographic location, network function, or capacity). Defining device groups may help ensure network symmetry and flow symmetry, which may be essential for maintaining optimal network performance and avoiding disruptions to stateful services such as NAT and firewall rules. By grouping routers and edge units into device groups, the SDWAN may ensure that each branch router is connected to only one hub router unit, and that each hub router unit is connected to at most one virtual hub, thus satisfying the symmetry requirement. Device groups may also help satisfy the full mesh requirement by allowing each pair of branch routers to directly connect to each other within a group. This may help ensure optimal network performance and avoid disruptions to stateful services.

Accordingly, in the SDWAN architecture 200 of FIG. 2, a device group A 214A includes the branch router A 202A and the branch router B 202B, as well as the hub routers in the hub router unit A 206A (i.e., the hub router A 204A and the hub router B 204B). Moreover, in the SDWAN architecture 200 of FIG. 2, a device group B 214B includes the branch router C 202C and the branch router D 202D, as well as the hub routers in the hub router unit B 206B (i.e., the hub router C 204C and the hub router D 204D).

In some cases, in the SDWAN architecture 200 of FIG. 2, communications that are allowed include the branch router A 202A directly communicating with the hub router A 204A, hub router B 204B, and branch router B 202B in device group A 214A. Similarly, branch router C 202C may be able to directly communicate with the hub router C 204C, hub router D 204D, and branch router D 202D in device group B 214B. In some cases, communications that are not allowed include the branch router A 202A directly communicating with the hub router C 204C or hub router D 204D in device group B 214B, and the branch router C 202C directly communicating with the hub router A 204A or hub router B 204B in device group A 214A.

In the SDWAN architecture 200 of FIG. 2, the full mesh 216 refers to the direct connections between each pair of the four branch routers, i.e., branch router A is directly connected to branch routers B, C, and D; branch router B is directly connected to branch routers A, C, and D; and so on. The full mesh 216 may enable efficient and direct communication between any two branch routers without the need to go through intermediate routers or hubs. This arrangement may reduce latency and increases network performance, especially for applications that require real-time data transmission, such as voice or video conferencing. Additionally, the full mesh 216 may provide redundancy in case of failure of any one branch router, as the other branch routers can still communicate with each other without disruption.

Figure 3:
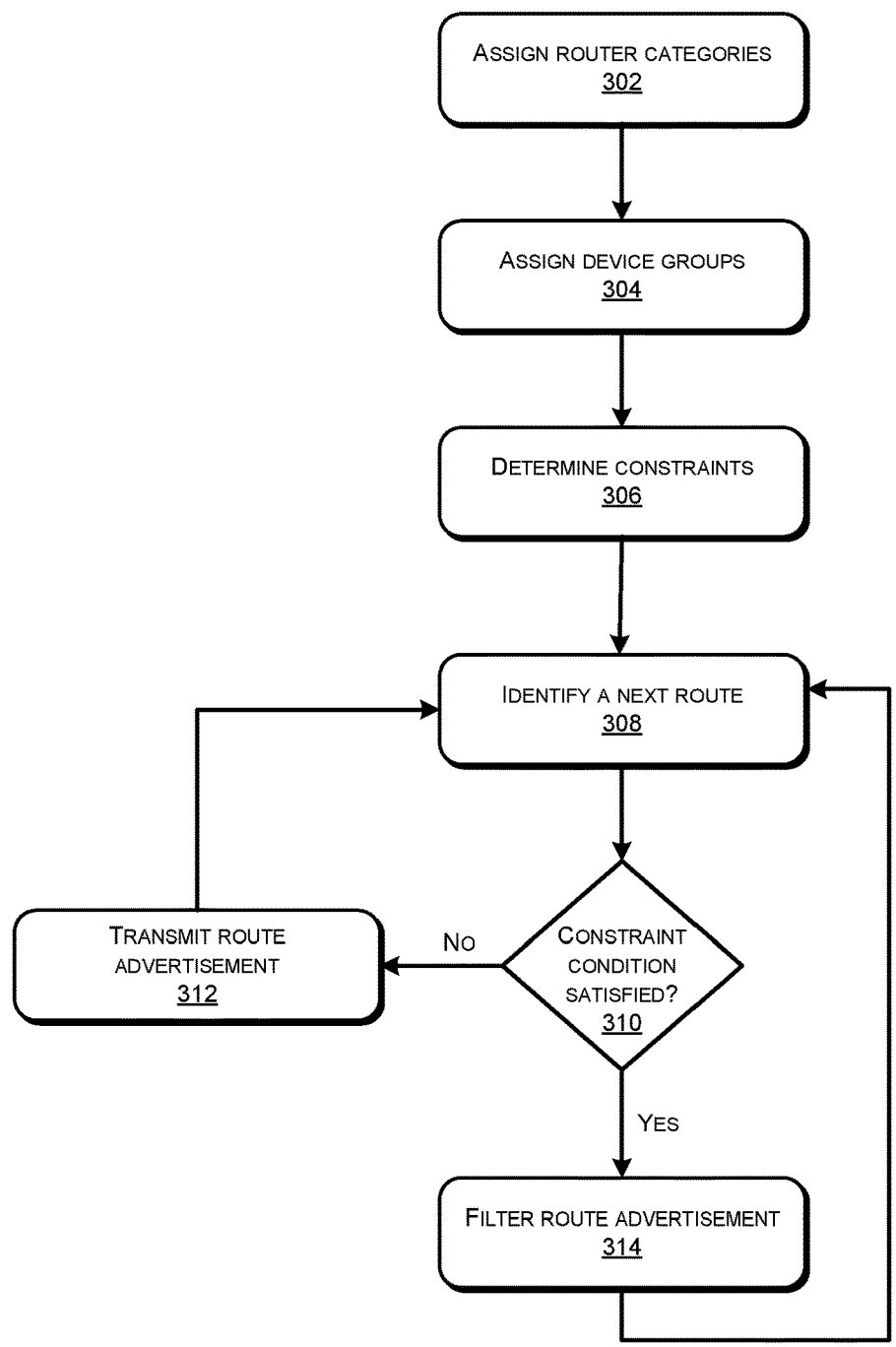
FIG. 3 is a flowchart diagram of an example process for determining whether to transmit a route advertisement to a plurality of routers (e.g., including one or more branch routers and/or one or more hub routers) of an SDWAN.

FIG. 3 is a flowchart diagram of an example process 300 for determining whether to transmit a route advertisement to a plurality of routers (e.g., including one or more branch routers and/or one or more hub routers) of an SDWAN. The process 300 may be performed by one or more virtual routing controllers (e.g., one or more virtual routing controllers operating on one or more virtual hubs) associated with the SDWAN.

As depicted in FIG. 3, at operation 302, the process 300 includes assigning a router tag to each of the plurality of routers in the SDWAN. A tag of a router may represent whether a router is a hub router or a branch router. In some cases, a hub router is associated with a "hub" tag. In some cases, a branch router is associated with a "branch" and/or a "spoke" tag.

At operation 304, the process 300 includes dividing the routers of the SDWAN into device groups. In some cases, a device group is a collection of branch routers and hub router units that are grouped together based on certain criteria (e.g., such as geographic location, network function, or capacity).

At operation 306, the process 300 includes determining constraint data for each router. The constraint data for a particular router may represent: (i) which router tags the router should be able to send a packet to only when routers of those router tags are in the same device group as the particular router, and/or (ii) the device group associated with the particular route. In some cases, if the constraint data for a first router represents a first router tag, then the first router should be able to send a packet to a second router associated with the first router tag only when the first router and the second router are in the same device group. In some cases, if the constraint data for a first router does not represent a second router tag, then the first router should be able to send a packet to a third router associated with the second router tag even when the first router and the third router are not in the same device group. The constraint data may be received from a router and at a routing controller device. The routing controller device may then use the constraint data to determine which route advertisement to transmit.

In some cases, the constraint data for a branch router should be that the hub router can only send a packet to other branch routers or hub router units that are in the same device group as the branch router, to comply with the symmetry requirement and the full mesh requirement of the SDWAN architecture. Accordingly, in some cases, the constraint data for a branch router represents that device group commonality requirement should be enforced if the destination router associated with a route originating from the particular branch router is associated with the hub router tag (e.g., the hub tag), such that a first branch router can communicate with a first hub router only if the hub router is in the same device group as the first branch router but the first branch router can communicate with a second branch router even if the second branch router is not in the same device group as the first branch router.

In some cases, the constraint data for a hub router should be that the hub router can only send a packet to branch routers that are in the same device group as the hub router, to comply with the symmetry requirement and the full mesh requirement of the SDWAN architecture. Accordingly, in some cases, the constraint data for a hub router represents that device group commonality requirement should be enforced if the destination router associated with a route originating from the particular hub router is associated with the branch router tag (e.g., the spoke tag), such that a first hub router can communicate with a first branch router only if the first hub router and the first branch router are in the same device group. In some cases, the constraint data for a hub router represents that device group commonality requirement should be enforced if the destination router associated with a route originating from the particular hub router is associated with the hub router tag (e.g., the hub tag), such that a first hub router can communicate with a second hub router only if the first hub router and the second hub router are in the same device group. In some cases, each device group cannot have more than one hub router unit. Accordingly, when the constraint data for a hub router represents the hub router tag (e.g., the hub tag), a first hub router can communicate with a second hub router only if the first hub router and the second hub router are in the same hub router unit.

In some cases, the constraint data for a hub router represents that device group commonality requirement should be enforced if the destination router associated with a route originating from the hub router is associated with one of the branch router tag (e.g., the spoke tag) or the hub router tag (e.g., the hub tag), such that a first hub router can communicate with a first branch router only if the first hub router and the first branch router are in the same device group, and the hub router can communicate with another hub router only if they are in the same hub router unit. In some cases, causing that the constraint data for a hub router to represent both the branch router tag (e.g., the spoke tag) and the hub router tag (e.g., the hub tag) ensures that a hub router unit is not overloaded with traffic from multiple device groups. In some cases, the constraint data for a hub router represents both the branch router and hub router tags, allowing the hub router to communicate with other hub routers and branch routers only if they are in the same device group and hub router unit, respectively. This may ensure that the full mesh and symmetry requirements are met while also preventing overload on any particular hub router unit or device group.

At operation 308, the process 300 includes identifying a next candidate route. In some cases, a route is characterized by a source router and a destination router. The source router may be a branch router or a hub router. The destination router may also be a branch router or a hub router.

At operation 310, the process 300 includes determining whether the next candidate route satisfies the constraint data associated with the route's source router. In some cases, if the next candidate route is associated with a source router that is a branch router, the next candidate route satisfies the constraint data if the destination router associated with the next candidate router is either a branch router or a hub router that is in the same device group as the source router. In some cases, if the next candidate route is associated with a source router that is a hub router, the next candidate route satisfies the constraint data if the destination router associated with the next candidate router is a branch router that is in the same device group as the source group. In some cases, if the next candidate route is associated with a source router that is a hub router, the next candidate route satisfies the constraint data if the destination router associated with the next candidate router is a router that is in the same device group as the source group.

At operation 312, based on (e.g., in response to) determining that the next candidate route satisfies the constraint data for the route's source router, the process 300 includes transmitting/providing a route advertisement associated with the next candidate route to the route's source router. In some cases, a route advertisement is a packet of information that is sent by a router in order to inform other routers on a network about the existence of a particular route. The information transmitted via a route advertisement may include the IP address of the destination network, as well as information about the router that is advertising the route, such as its IP address and the cost or metric associated with the route. Route advertisements may be an important component of routing protocols and/or may be used by routers to determine the best path for packets to travel from one network to another.

At operation 314, based on (e.g., in response to) determining that the next candidate route fails to satisfy the constraint data for the route's source router, the process 300 includes filtering the route advertisement. Filtering a route advertisement may include selectively blocking certain route advertisements from being propagated to a particular routing domain or network. This operation may include using filters or policies to control the flow of routing information between different networks or routing domains. In some cases, by filtering route advertisements, a virtual routing controller can restrict the propagation of routing information to only those networks or devices that need to receive it, while preventing unnecessary or unwanted traffic from being sent across the network.

In some cases, operations 308-314 are repeated until all of the candidate routes are examined. In some cases, given R routers, R*R candidate routes are examined, with each candidate route being associated with a respective source router of the R routers and a respective destination router of the R routers.

Figure 4:
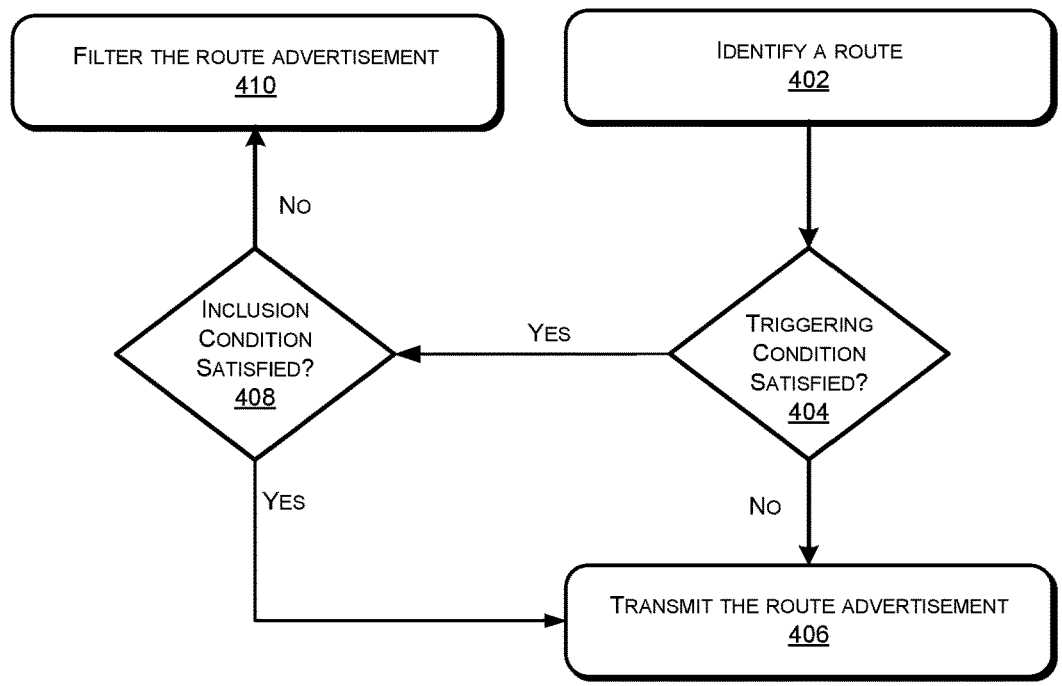
FIG. 4 is a flowchart diagram of an example process for determining whether to transmit a route advertisement to a destination router.

FIG. 4 is a flowchart diagram of an example process 400 for determining whether to transmit a route advertisement for a route to a source router associated with the route. At operation 402, the process 400 includes identifying a route.

At operation 404, the process 400 includes determining whether the route satisfies a triggering condition associated with the route's source router. In some cases, the triggering condition associated with a router represents which router tags the router should be able to send a packet to only when routers of those router tags are in the same device group as the particular router. In some cases, the triggering condition for a hub router represents the branch router tag (e.g., the spoke tag), such that a route originating from the particular hub router satisfies the triggering condition if the route's destination router is associated with the branch tag. In some cases, the constraint data for a hub router represents the hub router tag (e.g., the hub tag), such that a route originating from the particular hub router satisfies the triggering condition if the route's destination router is associated with the edge tag. In some cases, the constraint data for a hub router represents the branch router tag (e.g., the spoke tag) and the hub router tag (e.g., the hub tag), such that a route originating from the particular hub router satisfies the triggering condition if the route's destination router is associated with one of the branch tag or the edge tag. In some cases, the constraint data for a branch router represents the hub router tag (e.g., the hub tag), such that a route originating from the branch router satisfies the triggering condition if the route's destination router is associated with the hub router tag.

At operation 406, based on (e.g., in response to) determining that the route fails to satisfy the triggering condition, the process 400 includes transmitting the route advertisement associated with the route. The route advertisement may be transmitted to the source router associated with the route.

At operation 408, based on (e.g., in response to) determining that the route satisfies the triggering condition, the process 400 includes determining whether the route satisfies an inclusion condition. In some cases, a route satisfies the inclusion condition if the route's source router and the route's destination router are determined to be related. In some cases, a route satisfies the inclusion condition if the route's source router and the route's destination router are in the same device group.

Again at operation 406, based on (e.g., in response to) determining that the route satisfies the triggering condition and the inclusion condition, the process 400 includes transmitting the route advertisement associated with the route. The route advertisement may be transmitted to the source router associated with the route.

At operation 410, based on (e.g., in response to) determining that the route either fails to satisfy the triggering condition, or the route satisfies the triggering condition but fails to satisfy the inclusion conditions, the process 400 includes filtering the route advertisement associated with the route. In some cases, filtering a route advertisement may include selectively blocking certain route advertisements from being propagated to a particular routing domain or network.

FIG. 5 provides an operational example of constraint data 500 associated with a router. For example, the constraint data 500 may be associated with a router from the branch router tag. As depicted in FIG. 5, the constraint data 500 includes a first line that describes the inclusion condition for the corresponding router and a second line that describes the triggering condition for the corresponding router. The inclusion condition represents a unique numerical identifier of the device group for the corresponding router. The inclusion condition is triggered if the destination router for a route originating from the corresponding router is associated with at least one of the router tags described by the triggering condition. As depicted in FIG. 5, the constraint data 500 represents that, if the destination router for a route originating from the corresponding router is associated with a hub tag, then the route advertisement for the route is transmitted only if the destination router is in device group 1.

Figure 6:
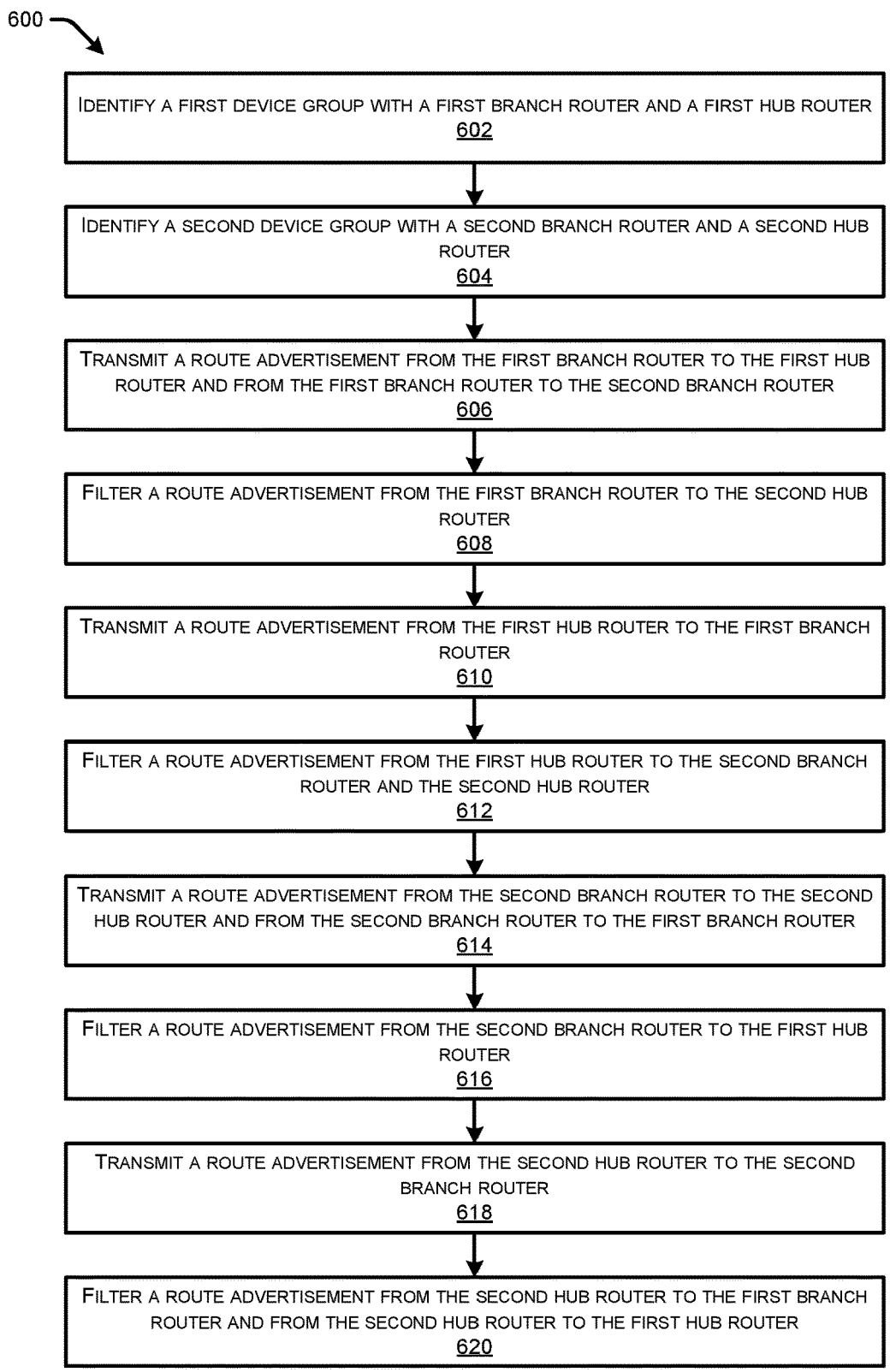
FIG. 6 is a flowchart diagram of an example process for selectively filtering route advertisements associated with a set of candidate routes associated with a set of routers.

FIG. 6 is a flowchart diagram of an example process 600 for selectively filtering route advertisements associated with a set of candidate routes associated with a set of routers. At operation 602, the process 600 includes identifying a first device group that includes a first branch router and a first hub router. In some cases, the first branch router is associated with a branch tag, and the first hub router is associated with a hub tag.

At operation 604, the process 600 includes identifying a second device group that comprises a second branch router and a second hub router. In some cases, the second branch router is associated with the branch tag, and the second hub router is associated with the hub tag. In some cases, a device group is a collection of branch routers and hub router units that are grouped together based on certain criteria (e.g., such as geographic location, network function, or capacity).

At operation 606, the process 600 includes transmitting to the first branch router: (i) a first route advertisement associated with a first route from the first branch router to the first hub router, and (ii) a second route advertisement associated with a second route from the first branch router to the second branch router.

In some cases, the constraint data associated with the first branch router includes: (i) a first condition (e.g., an inclusion condition) representing the first device group, and (ii) a second condition (e.g., a triggering condition) representing the hub tag. In some cases, transmitting the first route advertisement includes: (i) determining that the first route satisfies the second condition because the first route is associated with the first hub router as a destination device and the first hub router is associated with the hub tag, (ii) based on determining that the first route satisfies the second condition, determining that the first route satisfies the first condition because the first route is associated with the first hub router as the destination device and the first hub router is in the first device group, and (iii) based on determining that the first route satisfies the first condition, transmitting the first route advertisement to the first branch router. In some cases, transmitting the second route advertisement includes: (ii) determining that the second route fails to satisfy the second condition because the second route is associated with the second branch router as a destination device and the second branch router is not associated with the hub tag, and (ii) based on determining that the second route fails to satisfy the second condition, transmitting the first route advertisement to the first branch router.

At operation 608, the process 600 includes filtering (e.g., preventing transmission of) a third route advertisement associated with a third route from the first branch router to the second hub router. In some cases, preventing transmission of the third route advertisement includes: (i) determining that the third route satisfies the second condition because the third route is associated with the second hub router as a destination device and the second hub router is associated with the hub tag, (ii) based on determining that the third route satisfies the second condition, determining that the third route fails to satisfy the first condition because the third route is associated with the second hub router as the destination device and the second hub router is not in the first device group, and (iii) based on determining that the third route fails to satisfy the first condition, preventing transmission of the third route advertisement to the first branch router.

At operation 610, the process 600 includes transmitting a fourth route advertisement associated with a fourth route from the first hub router to the first branch router. In some cases, the constraint data associated with the first hub router includes: (i) a first condition (e.g., an inclusion condition) representing the first device group, and (ii) a second condition (e.g., a triggering condition) representing the branch tag and the hub tag.

In some cases, transmitting the fourth route advertisement includes: (i) determining that the fourth route satisfies the second condition because the fourth route is associated with the first branch router as the destination router and the first branch router is associated with the branch tag, (ii) based on determining that the fourth route satisfies the second condition, determining that the fourth route satisfies the first condition because the fourth route is associated with the first branch router as the destination router and the first branch router is in the first device group, and (iii) based on determining that the fourth route satisfies the second condition, transmitting the fourth route advertisement to the first hub router.

At operation 612, the process 600 includes filtering: (i) a fifth route advertisement associated with a fifth route from the first hub router to the second branch router, and (ii) a sixth route advertisement associated with a sixth route from the first hub router to the second hub router. In some cases, preventing transmission of the fifth route advertisement includes: (i) determining that the fifth route satisfies the second condition because the fifth route is associated with the second branch router as the destination router and the second branch router is associated with the branch tag, (ii) based on determining that the fifth route satisfies the second condition, determining that the fifth route fails to satisfy the first condition because the fifth route is associated with the second branch router as the destination router and the second branch router is not in the first device group, and (iii) based on determining that the fifth route fails to satisfy the second condition, preventing transmission of the fifth route advertisement to the first hub router.

In some cases, preventing transmission of the sixth route advertisement includes: (i) determining that the sixth route satisfies the second condition because the sixth route is associated with the second hub router as the destination router and the second hub router is associated with the hub tag. (ii) based on determining that the sixth route satisfies the second condition, determining that the sixth route fails to satisfy the first condition because the sixth route is associated with the second hub router as the destination router and the second hub router is not in the first device group, and (iii) based on determining that the sixth route fails to satisfy the second condition, preventing transmission of the sixth route advertisement to the first hub router.

At operation 614, the process 600 includes transmitting to the second branch router: (i) a seventh route advertisement associated with a seventh route from the second branch router to the second hub router, and (ii) an eighth route advertisement associated with an eighth route from the second branch router to the first branch router.

In some cases, the constraint data associated with the second branch router includes: (i) a first condition (e.g., an inclusion condition) representing the second device group, and (ii) a second condition (e.g., a triggering condition) representing the hub tag. In some cases, transmitting the seventh route advertisement includes: (i) determining that the seventh route satisfies the second condition because the seventh route is associated with the second hub router as a destination device and the second hub router is associated with the hub tag. (ii) based on determining that the seventh route satisfies the second condition, determining that the seventh route satisfies the first condition because the seventh route is associated with the second hub router as the destination device and the second hub router is in the second device group, and (iii) based on determining that the seventh route satisfies the first condition, transmitting the seventh route advertisement to the second branch router.

In some cases, transmitting the eighth route advertisement includes: (ii) determining that the eighth route fails to satisfy the second condition because the eighth route is associated with the first branch router as a destination device and the first branch router is not associated with the hub tag, and (ii) based on determining that the eighth route fails to satisfy the second condition, transmitting the eighth route advertisement to the second branch router.

At operation 616, the process 600 includes filtering a ninth route advertisement associated with a ninth route from the second branch router to the first hub router. In some cases, preventing transmission of the ninth route advertisement includes: (i) determining that the ninth route satisfies the second condition because the ninth route is associated with the first hub router as a destination device and the first hub router is associated with the hub tag, (ii) based on determining that the ninth route satisfies the second condition, determining that the ninth route fails to satisfy the first condition because the ninth route is associated with the first hub router as the destination device and the first hub router is not in the second device group, and (iii) based on determining that the ninth route fails to satisfy the first condition, preventing transmission of the ninth route advertisement to the second branch router.

At operation 618, the process 600 includes transmitting a tenth route advertisement associated with a tenth route from the second hub router to the second branch router to the first hub router. In some cases, the constraint data associated with the second hub router includes: (i) a first condition (e.g., an inclusion condition) representing the second device group, and (ii) a second condition (e.g., a triggering condition) representing the branch tag and the hub tag. In some cases, transmitting the tenth route advertisement includes: (i) determining that the tenth route satisfies the second condition because the tenth route is associated with the second branch router as the destination router and the second branch router is associated with the branch tag. (ii) based on determining that the tenth route satisfies the second condition, determining that the tenth route satisfies the first condition because the tenth route is associated with the second branch router as the destination router and the second branch router is in the second device group, and (iii) based on determining that the tenth route satisfies the second condition, transmitting the tenth route advertisement to the second hub router.

At operation 620, the process 600 includes filtering: (i) an eleventh route advertisement associated with an eleventh route from the second hub router to the first branch router, and (ii) a twelfth route advertisement associated with a twelfth route from the second hub router and the first hub router. In some cases, preventing transmission of the eleventh route advertisement includes: (i) determining that the eleventh route satisfies the second condition first the eleventh route is associated with the first branch router as the destination router and the second branch router is associated with the branch tag. (ii) based on determining that the eleventh route satisfies the second condition, determining that the eleventh route fails to satisfy the first condition because the eleventh route is associated with the first branch router as the destination router and the first branch router is not in the second device group, and (iii) based on determining that the eleventh route fails to satisfy the second condition, preventing transmission of the eleventh route advertisement to the second hub router.

In some cases, preventing transmission of the twelfth route advertisement includes: (i) determining that the twelfth route satisfies the second condition because the twelfth route is associated with the first hub router as the destination router and the first hub router is associated with the hub tag, (ii) based on determining that the twelfth route satisfies the second condition, determining that the twelfth route fails to satisfy the first condition because the twelfth route is associated with the first hub router as the destination router and the first hub router is not in the second device group, and (iii) based on determining that the twelfth route fails to satisfy the second condition, preventing transmission of the twelfth route advertisement to the second hub router.

Figure 7:
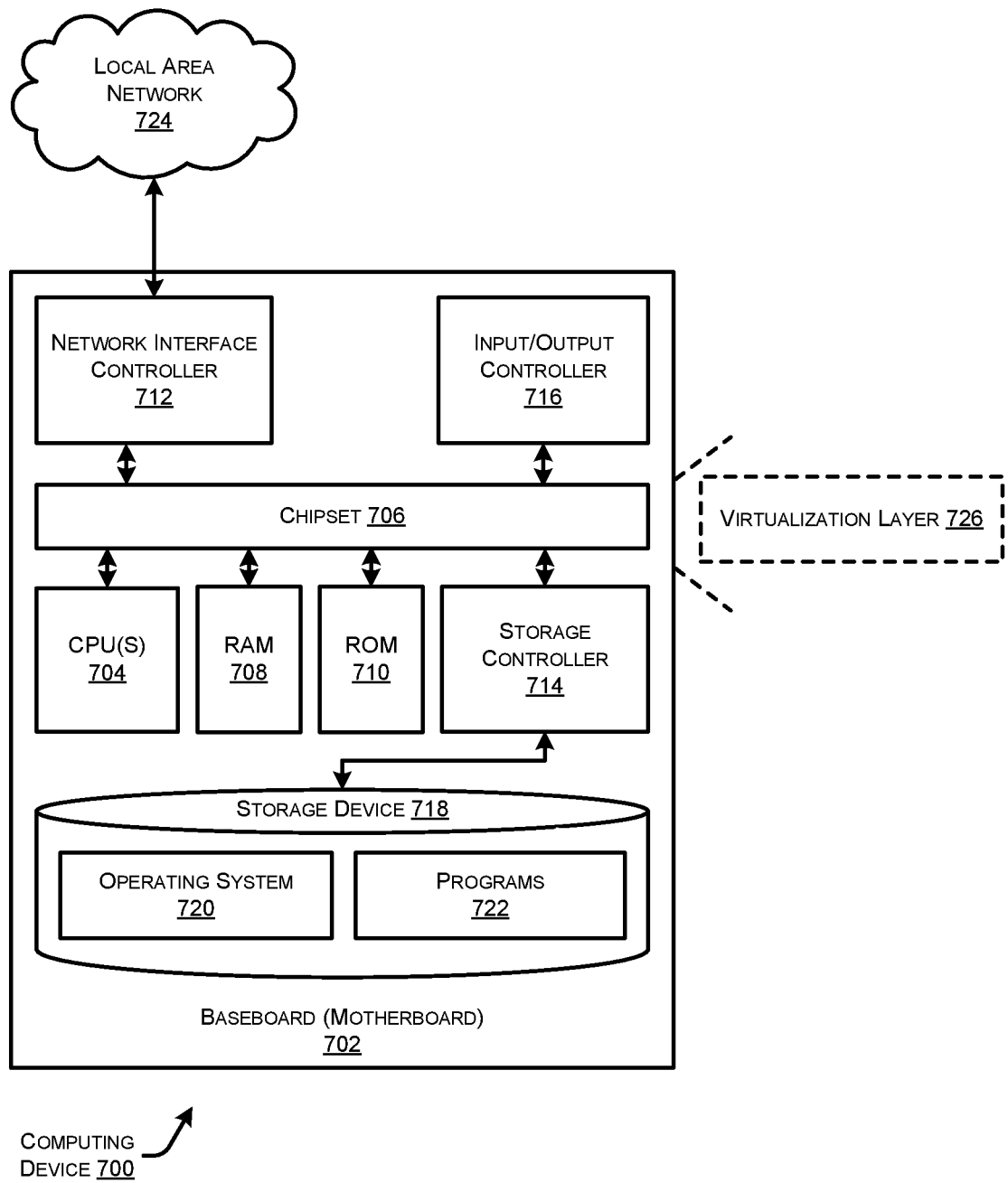
FIG. 7 shows an example computer architecture for a computing device (or network routing device) capable of executing program components for implementing the functionality described above.

FIG. 7 shows an example computer architecture for a computing device (or network routing device) 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 700 may, in some examples, correspond to a physical server of a cloud computing framework 104 of FIG. 1, a branch router 102 of FIG. 1, and/or the packet switching device 800 of FIG. 8.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 724. The chipset 706 can include functionality for providing network connectivity through a NIC 712, such as a gigabit Ethernet adapter. The NIC 712 is capable of connecting the computing device 700 to other computing devices over the network 724. It should be appreciated that multiple NICs 712 can be present in the computing device 700, connecting the computer to other types of networks and remote computer systems.

The computing device 700 can be connected to a storage device 718 that provides non-volatile storage for the computing device 700. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by a cloud computing framework 104, and or any components included therein, may be supported by one or more devices similar to computing device 700. Stated otherwise, some or all of the operations performed by the cloud computing framework 104, and or any components included therein, may be performed by one or more computing device 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to FIGS. 3-X. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

Figure 8:
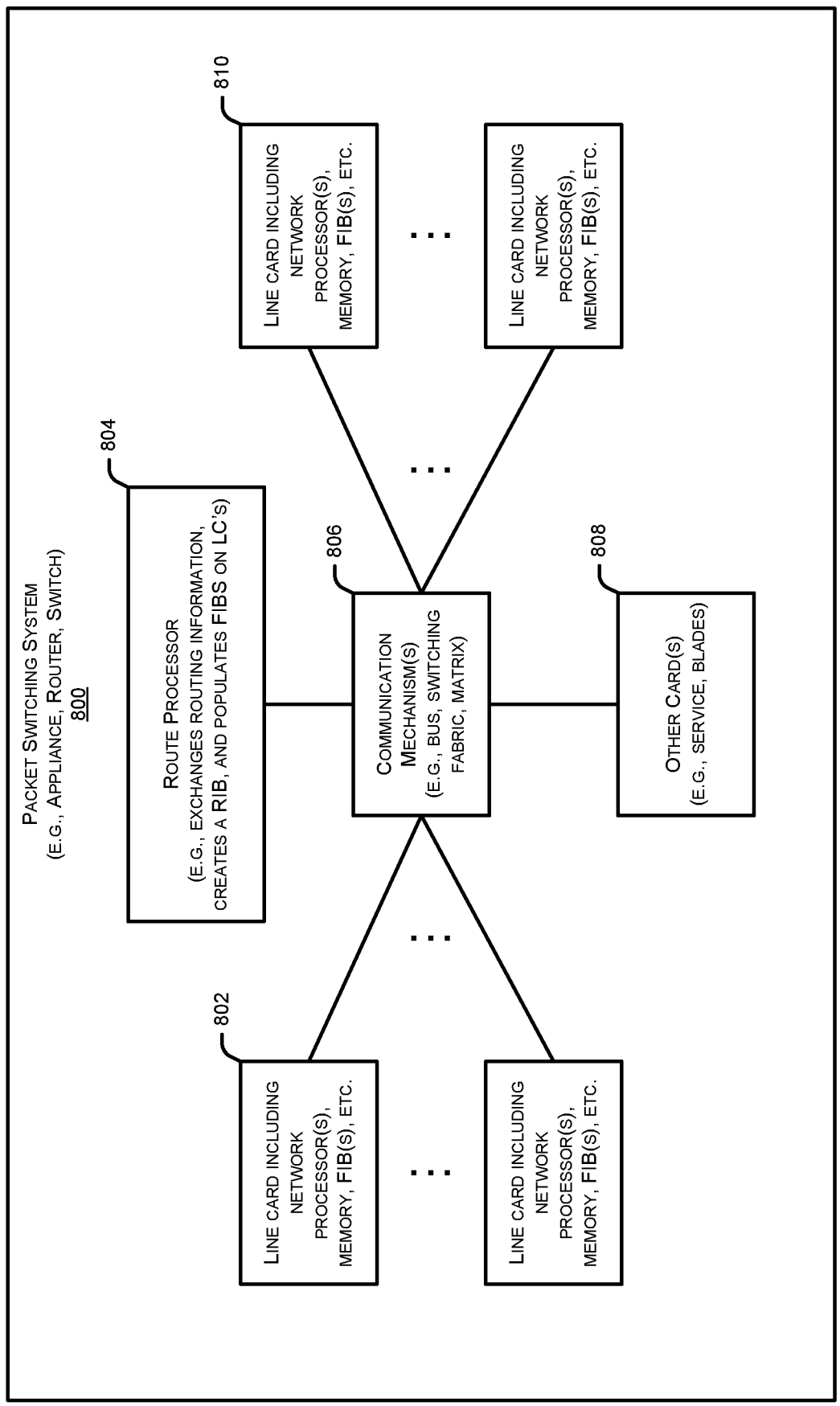
FIG. 8 illustrates a block diagram illustrating an example packet switching device (or system) that can be utilized to implement various aspects of the technologies disclosed herein.

The computing device 700 may support a virtualization layer 726, such as one or more components associated with a computing resource network. FIG. 8 illustrates a block diagram illustrating an example packet switching device (or system) 800 that can be utilized to implement various aspects of the technologies disclosed herein. In some examples, packet switching device(s) 800 may be employed in various networks, such as an SDWAN. The packet switching device may, for example, be a branch router or a hub router.

In some examples, a packet switching device 800 may comprise multiple line card(s) 802, 810, each with one or more network interfaces for sending and receiving packets over communications links (e.g., possibly part of a link aggregation group). The packet switching device 800 may also have a control plane with one or more processing elements 804 for managing the control plane and/or control plane processing of packets associated with forwarding of packets in a network. The packet switching device 800 may also include other cards 808 (e.g., service cards, blades) which include processing elements that are used to process (e.g., forward/send, drop, manipulate, change, modify, receive, create, duplicate, apply a service) packets associated with forwarding of packets in a network. The packet switching device 800 may comprise hardware-based communication mechanism 806 (e.g., bus, switching fabric, and/or matrix, etc.) for allowing its different entities 802, 804, 808 and 810 to communicate. Line card(s) 802, 810 may typically perform the actions of being both an ingress and/or an egress line card 802, 810, in regard to multiple other particular packets and/or packet streams being received by, or sent from, packet switching device 800.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining a first device group, wherein: (i) the first device group comprises a first router and a second router, (ii) the first router is associated with a branch tag, and (ii) the second router is associated with a hub tag;
   determining a second device group, wherein: (i) the second device group comprises a third router and a fourth router, (ii) the third router is associated with the branch tag, and (ii) the fourth router is associated with the hub tag;

determining to transmit a first route advertisement associated with a first route to the first router, wherein the first route is from the first router to the second router, and wherein determining to transmit the first route advertisement associated with the first route is based on determining that the first router and the second router are in a common device group;

based on determining to transmit the first route advertisement, transmitting the first route advertisement;

determining to transmit a second route advertisement associated with a second route to the first router, wherein the second route is from the first router to the third router, and wherein determining to transmit the second route advertisement associated with the second route is based on determining that both the first router and the third router are associated with the branch tag;

based on determining to transmit the second route advertisement, transmitting the second route advertisement;

determining to prevent transmission of a third route advertisement associated with a third route to the first router, wherein the third route is from the first router to the fourth router, and wherein determining to prevent transmission of the third route advertisement associated with the third route is based on determining that:
the first router and the fourth router are in different device groups, and
the first router and the fourth router are associated with different tags; and based on determining to prevent transmission of the third route advertisement, preventing transmission of the third route advertisement.

2. The method of claim 1, further comprising:
receiving, from the first router and at a routing controller device, (i) first data representing that the first router is associated with the branch tag, (ii) second data representing that the first router is associated with the first device group, and (iii) constraint data associated with the first router, wherein the constraint data comprises: (i) a first condition representing the first device group, and (ii) a second condition representing the hub tag, and wherein:
transmitting the first route and the second route and preventing transmission of the third route is performed by the routing controller device, and
the first condition is applied in relation to data transmissions to hub routers but not to data transmissions to branch routers because the first router is associated with the branch tag.

3. The method of claim 2, wherein transmitting the first route advertisement comprises:
determining that the first route satisfies the second condition because the first route is associated with the second router as a destination device and the second router is associated with the hub tag;
based on determining that the first route satisfies the second condition, determining that the first route satisfies the first condition because the first route is associated with the second router as the destination device and the second router is in the first device group; and
based on determining that the first route satisfies the first condition, transmitting the first route advertisement to the first router.

4. The method of claim 2, wherein transmitting the second route advertisement comprises:
determining that the second route fails to satisfy the second condition because the second route is associated with the third router as a destination device and the third router is not associated with the hub tag; and
based on determining that the second route fails to satisfy the second condition, transmitting the first route advertisement to the first router.

5. The method of claim 2, wherein preventing transmission of the third route advertisement comprises:
determining that the third route satisfies the second condition because the third route is associated with the fourth router as a destination device and the fourth router is associated with the hub tag;
based on determining that the third route satisfies the second condition, determining that the third route fails to satisfy the first condition because the third route is associated with the fourth router as the destination device and the fourth router is not in the first device group; and
based on determining that the third route fails to satisfy the first condition, preventing transmission of the third route advertisement to the first router.

6. The method of claim 1, wherein:
the first router, the second router, the third router, and the fourth router are part of a software-defined wide area network (SDWAN),
the SDWAN comprises a plurality of virtual hubs, and
each router associated with the hub tag is directly connected to no more than and no less than one of the plurality of virtual hubs.

7. The method of claim 6, wherein each virtual hub is configured to access a virtual network of the SDWAN.

8. The method of claim 6, wherein the method is performed by a virtual controller software executing on at least one of the plurality of virtual hubs.

9. The method of claim 6, wherein at least one of the plurality of virtual hubs is configured to access an external network using a firewall software.

10. The method of claim 1, wherein the first route is an overlay route.

11. The method of claim 1, further comprising:
receiving, from the second router and at a routing controller device, (i) first data representing that the second router is associated with the hub tag, (ii) second data representing that the second router is associated with the first device group, and (iii) constraint data associated with the second router, wherein the constraint data comprises a first condition representing the first device group.

12. The method of claim 11, further comprising:
determining, by the routing controller device, that a fourth route from the second router to the first router satisfies the constraint data because the fourth route is associated with the first router as a destination device and the first router is associated with the first device group; and
based at least in part on determining that the fourth route satisfies the constraint data, transmitting, by the routing controller device, a fourth route advertisement associated with the fourth route to the second router.

13. The method of claim 11, further comprising:
determining, by the routing controller device, that a fifth route from the second router to the third router fails to satisfy the constraint data because the fifth route is associated with the third router as a destination device and the third router is not associated with the first device group; and
based at least in part on determining that the fifth route fails to satisfy the constraint data, preventing, by the routing controller device, transmission of a fifth route advertisement associated with the fifth route to the second router.

14. The method of claim 11, further comprising:
determining, by the routing controller device, that a sixth route from the second router to the fourth router fails to satisfy the constraint data because the sixth route is associated with the fourth router as a destination device and the fourth router is not associated with the first device group; and
based at least in part on determining that the sixth route fails to satisfy the constraint data, preventing, by the routing controller device, transmission of a sixth route advertisement associated with the sixth route to the second router.

15. A system comprising:
one or more processors; and
one or more computer-readable media storing computer-executable instructions that, when executed by the one or more processors, cause the one or more processors to perform operations comprising:
determining a first device group, wherein: (i) the first device group comprises a first router and a second router, (ii) the first router is associated with a branch tag, and (ii) the second router is associated with a hub tag;
determining a second device group, wherein: (i) the second device group comprises a third router and a fourth router, (ii) the third router is associated with the branch tag, and (ii) the fourth router is associated with the hub tag;
determining to transmit a first route advertisement associated with a first route to the first router, wherein the first route is from the first router to the second router, and wherein determining to transmit the first route advertisement associated with the first route is based on determining that the first router and the second router are in a common device group;
based on determining to transmit the first route advertisement, transmitting the first route advertisement;
determining to transmit a second route advertisement associated with a second route to the first router, wherein the second route is from the first router to the third router, and wherein determining to transmit the second route advertisement associated with the second route is based on determining that both the first router and the third router are associated with the branch tag;
based on determining to transmit the second route advertisement, transmitting the second route advertisement;
determining to prevent transmission of a third route advertisement associated with a third route to the first router, wherein the third route is from the first router to the fourth router, and wherein determining to prevent transmission of the third route advertisement associated with the third route is based on determining that:
the first router and the fourth router are in different device groups, and
the first router and the fourth router are associated with different tags; and
based on determining to prevent transmission of the third route advertisement, preventing transmission of the third route advertisement.

16. The system of claim 15, the operations further comprising:
receiving, from the first router and at a routing controller device, (i) first data representing that the first router is associated with the branch tag, (ii) second data representing that the first router is associated with the first device group, and (iii) constraint data associated with the first router, wherein the constraint data comprises:
(i) a first condition representing the first device group, and (ii) a second condition representing the hub tag, and wherein:
transmitting the first route and the second route and preventing transmission of the third route is performed by the routing controller device, and
the first condition is applied in relation to data transmissions to hub routers but not to data transmissions to branch routers because the first router is associated with the branch tag.

17. The system of claim 16, wherein transmitting the first route advertisement comprises:
determining that the first route satisfies the second condition because the first route is associated with the second router as a destination device and the second router is associated with the hub tag;
based on determining that the first route satisfies the second condition, determining that the first route satisfies the first condition because the first route is associated with the second router as the destination device and the second router is in the first device group; and
based on determining that the first route satisfies the first condition, transmitting the first route advertisement to the first router.

18. The system of claim 16, wherein transmitting the second route advertisement comprises:
determining that the second route fails to satisfy the second condition because the second route is associated with the third router as a destination device and the third router is not associated with the hub tag; and
based on determining that the second route fails to satisfy the second condition, transmitting the first route advertisement to the first router.

19. One or more non-transitory computer-readable media storing computer-executable instructions that, when executed by one or more processors, cause the one or more processors to perform operations comprising:
determining a first device group, wherein: (i) the first device group comprises a first router and a second router, (ii) the first router is associated with a branch tag, and (ii) the second router is associated with a hub tag;
determining a second device group, wherein: (i) the second device group comprises a third router and a fourth router, (ii) the third router is associated with the branch tag, and (ii) the fourth router is associated with the hub tag;
determining to transmit a first route advertisement associated with a first route to the first router, wherein the first route is from the first router to the second router, and wherein determining to transmit the first route advertisement associated with the first route is based on determining that the first router and the second router are in a common device group;
based on determining to transmit the first route advertisement, transmitting the first route advertisement;
determining to transmit a second route advertisement associated with a second route to the first router, wherein the second route is from the first router to the third router, and wherein determining to transmit the second route advertisement associated with the second route is based on determining that both the first router and the third router are associated with the branch tag;

based on determining to transmit the second route advertisement, transmitting the second route advertisement;

determining to prevent transmission of a third route advertisement associated with a third route to the first router, wherein the third route is from the first router to the fourth router, and wherein determining to prevent transmission of the third route advertisement associated with the third route is based on determining that:

the first router and the fourth router are in different device groups, and the first router and the fourth router are associated with different tags; and based on determining to prevent transmission of the third route advertisement, preventing transmission of the third route advertisement.

20. The one or more non-transitory computer-readable media of claim 19, the operations further comprising:

receiving, from the first router and at a routing controller device, (i) first data representing that the first router is associated with the branch tag, (ii) second data representing that the first router is associated with the first device group, and (iii) constraint data associated with the first router, wherein the constraint data comprises: (i) a first condition representing the first device group, and (ii) a second condition representing the hub tag, and wherein:

transmitting the first route and the second route and preventing transmission of the third route is performed by the routing controller device, and the first condition is applied in relation to data transmissions to hub routers but not to data transmissions to branch routers because the first router is associated with the branch tag.

* * * * *